United States Patent
Centonze et al.

(10) Patent No.: US 8,006,233 B2
(45) Date of Patent: Aug. 23, 2011

(54) SYSTEM AND METHOD FOR THE AUTOMATIC VERIFICATION OF PRIVILEGE-ASSERTING AND SUBJECT-EXECUTED CODE

(75) Inventors: Paolina Centonze, Amawalk, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/677,259

(22) Filed: Feb. 21, 2007

(65) Prior Publication Data

US 2008/0201688 A1    Aug. 21, 2008

(51) Int. Cl.
*G06F 9/44* (2006.01)
*G06F 9/45* (2006.01)

(52) U.S. Cl. ........ 717/126; 717/125; 717/127; 717/132; 717/152; 717/154; 717/157

(58) Field of Classification Search ........................ None
See application file for complete search history.

(56) References Cited

U.S. PATENT DOCUMENTS

| | | | |
|---|---|---|---|
| 7,133,846 B1 * | 11/2006 | Ginter et al. | 705/54 |
| 2009/0287837 A1 * | 11/2009 | Felsher | 709/229 |

OTHER PUBLICATIONS

Pistola et al., "Interprocedural Analysis for Privileged Code Placement and Tainted Variable Detection", in Proceedings of the 19th European Conference on Object-Oriented Programming, pp. 362-386, Glasgow, Scotland UK, Jul. 2005, Springer-Verlag.
Barbara G. Ryder, "Dimensions of Precision in Reference Analysis of Object-Oriented Languages", in Proceedings of the 12th International Conference on Compiler Construction, pp. 126-137, Warsaw, Poland, Apr. 2003, Invited Paper.
Koved et al., "Access Rights Analysis for Java", in Proceedings of the 17th ACM SIGPLAN Conference on Object-Oriented Programming, Systems, Languages.
Lai et al., "User Authentication and Authorization in the JavaTM Platform", in Proceedings of the 15th Annual Computer Security Applications Conference, pp. 285-290, Scottsdale, AZ, USA, Dec. 1999, IEEE Computer Security.
Saltzer et al., "The Protection of Information in Computer Systems", in Proceedings of the IEEE, vol. 63, pp. 1278-1308, Sep. 1975.
Gulwani et al., "Path-Sensitive Analysis for Linear Arithmetic and Uninterpreted Functions", in 11th Static Analysis Sumposium, vol. 3148 of LNCS, pp. 328-343, Aug. 2004.

(Continued)

*Primary Examiner* — Chuck O Kendall
(74) *Attorney, Agent, or Firm* — Cantor Colburn LLP; Preston Young

(57) ABSTRACT

The present relates to a method for verifying privileged and subject-executed code within a program, the method further comprising the steps of constructing a static model of a program, identifying checkPermission nodes that are comprised within the invocation graph, and performing a fixed-point iteration, wherein each determined permission set is propagated backwards across the nodes of the static model until a privilege-asserting code node is reached. The method further comprises the steps of associating each node of the invocation graph with a set of Permission allocation sites, analyzing each identified privilege-asserting code node and subject-executing code node to determine the Permission allocation site set that is associated with each privilege-asserting code node and subject-executing code node, and determining the cardinality of a Permission allocation-site set that is associated with each privilege-asserting code node and subject-executing code node.

21 Claims, 6 Drawing Sheets

OTHER PUBLICATIONS

Gleb Naumovich, "A Conservative Algorithm for Computing the Flow of Permissions in Java Programs", in Proceedings with ISSTA, pp. 33-43, Rome, Italy, Jul. 2002.

Gleb Naumovich, "A Conservative Algorithm for Computing the Flow of Permissions in Java Programs", Dec. 2001, http://cis.poly.edu/tr/tr-cls-2001-07.pdf.

Pistola et al., "Enterprise Java Security: Building Secure J2EE Applications", Addison-Wesley Apprentice Hall, 1999.

Ole Agesen "The Cartesian Product Algorithm: Simple and Precise Type Inference of Parametric Polymorphism" in Proceedings of the 9th ECOOP, pp. 2-26, Aarhus, Denmark Aug. 1995, Spring-Verlag Anderson et al., "Design and Implementation of a Fine-Grained Software Inspection Tool", IEEE Transactions on Software Engineering, 29(8):721-733, Aug. 2003.

Paul et al., "NET Security: Lesson Learned and Missed from Java", Univ. of VA, Dept. of Computer Science, In Proceedings of the ACSAC pp. 1-10, Dec. 2004. Kildall "A Unified Approach to Global Program Optimization" Proceedings of 1st Annual ACM SIGACT-SIGPLAN Symposium on Principles of Programming Languages, pp. 194-206, MA, USA 1973.

* cited by examiner

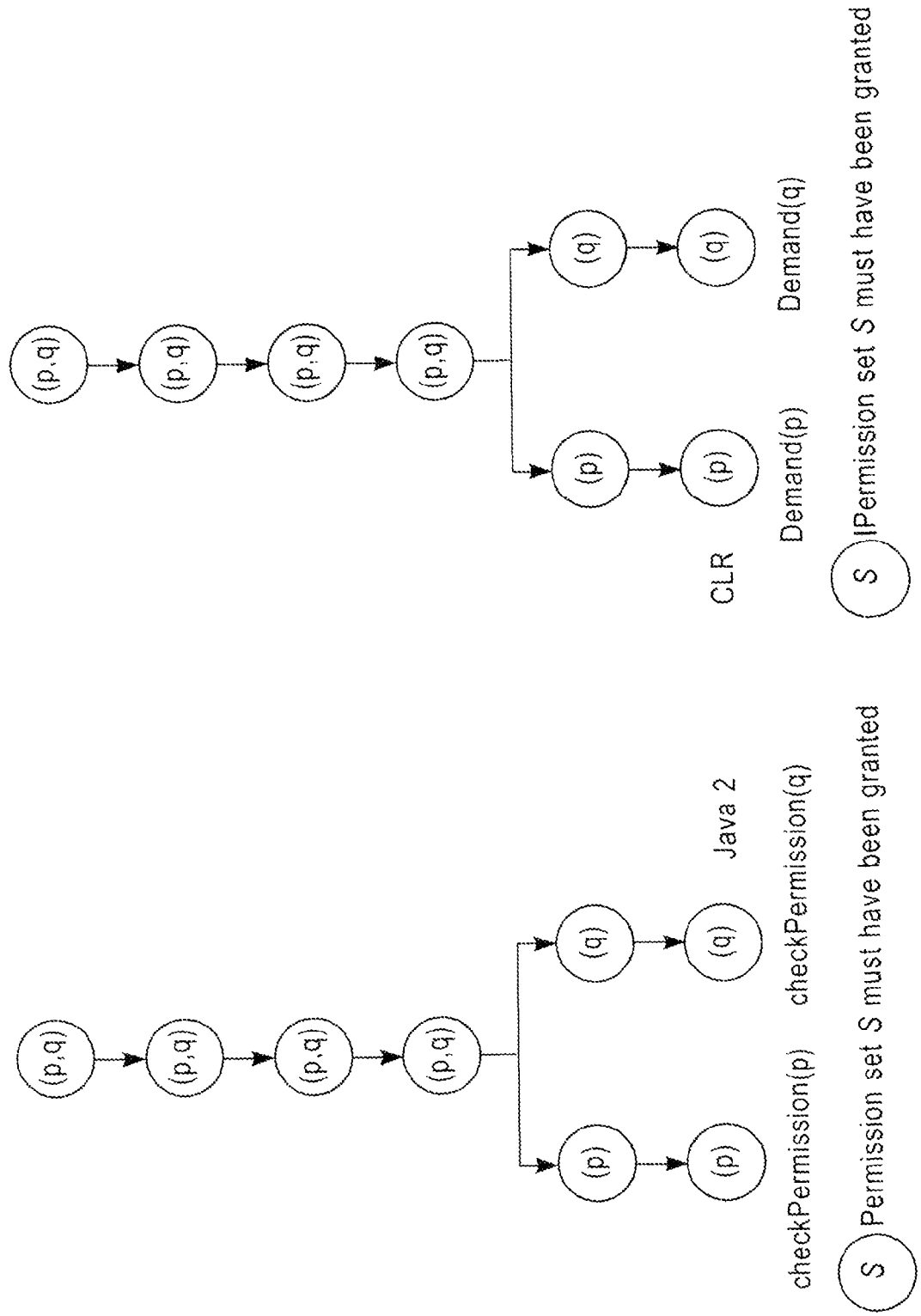

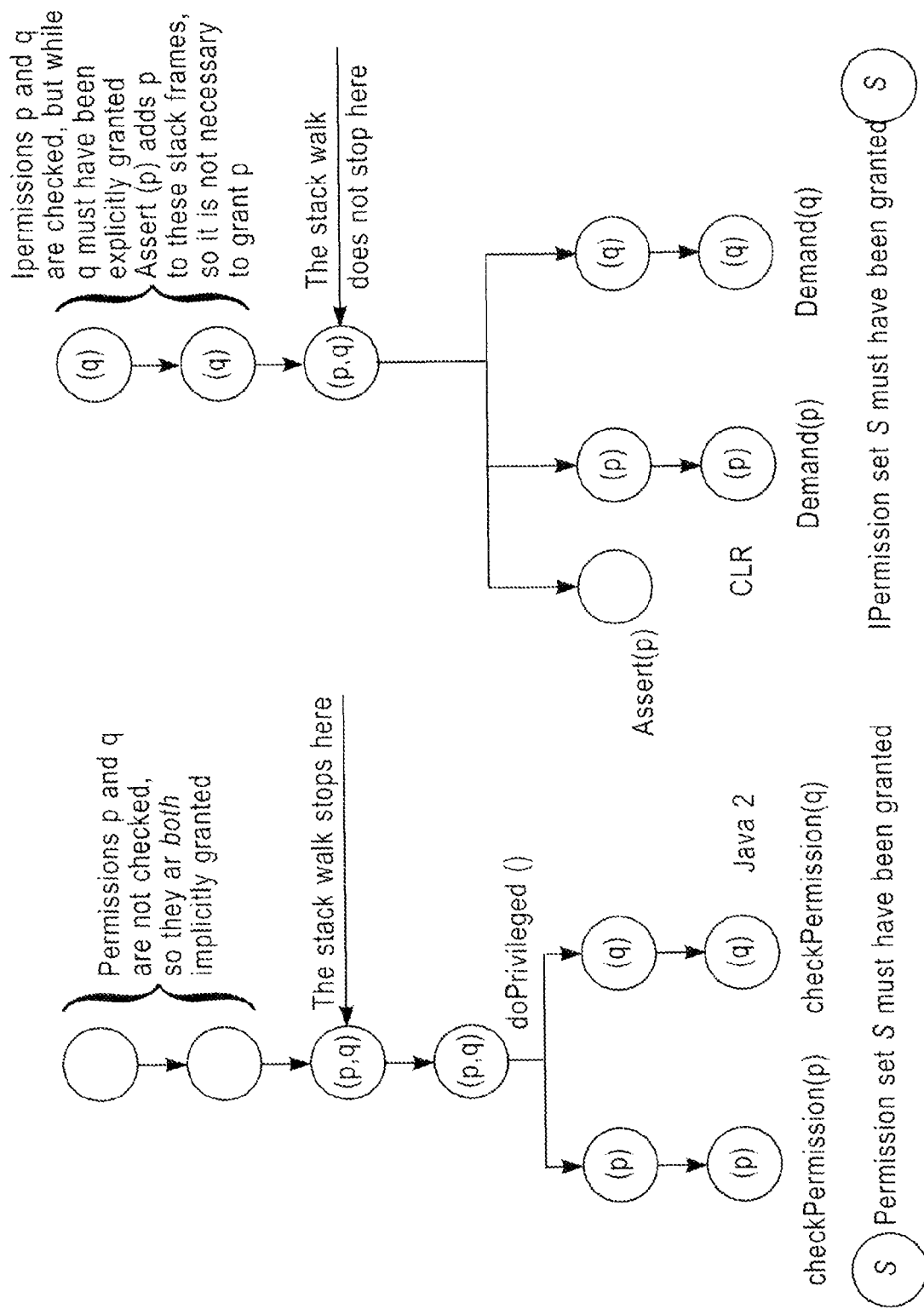

```
import java.io.*;
import java.net.*;
public class LibraryCode {
    private static String logFileName = "audit.txt";
    public static Socket createSocket(String host, int port)
        throws UnknownHostException, IOException {
        // Create the Socket
        Socket socket = new Socket(host, port);
        // Log the Socket operation to a file
        FileOutputStream fos = new FileOutputStream(logFileName);
        BufferedOutputStream bos = new BufferedOutputStream(fos);
        PrintStream ps = new PrintStream(bos, true);
        ps.print("Socket " + host + ";" + port);
        return socket;
    }
}
```

FIG. 3

| Client.main() | |
|---|---|
| LibraryCode.createSocket(host, port) | p,q |

| | |
|---|---|
| Socket.<init>(host, port) | q |
| SecurityManager.checkConnect(host, port) | q |
| SecurityManager.checkPermission(q) | q |
| AcessController.checkPermission(q) | q |

| | |
|---|---|
| FileOutputStream.<init>(logFileName) | p |
| SecurityManager.checkWrite(logFileName) | p |
| SecurityManager.checkPermission(p) | p |
| AcessController.checkPermission(p) | p | p = new java.io.FilePermission(logFileName, "write");
q = new java.net.SocketPermission(host, port);

FIG. 4

```
import java.io.*;
import java.net.*;
import java.security.*;
public class LibraryCode2 {
    private static final String logFileName = "audit.txt";
    public static Socket createSocket(String host, int port) throws
            UnknownHostException, IOException, PrivilegedActionException {
        // Create the Socket
        Socket socket = new Socket(host, port);
        // Log the Socket operation to a file using doprivileged
        File f = new File(logFileName);
        PrivWriteOp op = new PrivWriteOp(host, port, f);
        FileOutputStream fos = (FileOutputStream)
            AccessController.doprivileged(op);
        BufferedOutputStream bos = new BufferedOutputStream(fos);
        PrintStream ps = new PrintStream(bos,true);
        ps.print("Socket " + host + ";" + port);
        return socket;
    }
}
class PrivWriteOp implements PrivilegedExceptionAction {
    private File f;
    PrivWriteOp (File f) {
        this.f = f;
    }
    public Object run() throws IOException {
        return new FileOutputStream(f);
    }
}
```

FIG. 5

SYSTEM AND METHOD FOR THE AUTOMATIC VERIFICATION OF PRIVILEGE-ASSERTING AND SUBJECT-EXECUTED CODE

BACKGROUND OF THE INVENTION

1. Field of the Invention

This invention relates to the verifying of code access control protocols, and particularly to the automatic verification of privilege-asserting and subject-executed code 2. Description of Background Before our invention, conventionally within security systems where access control was based on stack inspection, when access to a protected resource was attempted all the callers on the stack must have exhibited the right to perform the security-sensitive operation of accessing the protected resource. Within security systems the implementation of privilege-asserting code allows for the stopping a stack inspection so that the callers of a trusted component are not required to exhibit a right to access a protected resource. The implementation of subject-executed code allows for the execution of code under the authority of a subject (a user or service). Additionally, permissions within a security system are typically defined as access rights.

Several problems can occur in relation to the implementation of privilege-asserting and subject-executed code. For example, in stack-inspection-based authorization systems (e.g., Microsoft™ .NET Common Language Runtime (CLR)), a developer can specify which permission can be implicitly granted to client code when privilege-asserting code is used. This aspect allows a developer to explicitly control what permissions the client code will receive as a result of invoking trusted code. However, other systems (e.g., Java™ 2) are not so fine grained when it comes to privilege-asserting code, and thus do not allow specifying the particular permission requirement from which the client is shielded. In such systems, a call to privilege-asserting code can shield client code from multiple permission requirements, which means that the client code is implicitly granted all the permissions that are regulated by the permission requirements. This behavior may not be intended and can easily lead to security flaws.

A similar principle dictates that a call to subject-executed code should only perform one security-sensitive operation. Thus, in the event that multiple security sensitive operations are to be performed the security operations should be performed under different subject-executed calls. However, enforcing this principle requires the writing of additional code in addition to possessing knowledge of what security-sensitive operations are going to be performed as a result of each function call. For this reason, developers tend to write subject-executed code that performs multiple security-sensitive operations. Detecting whether this principle has been violated or verifying that it has been respected is very difficult too, unless an automated tool is used to detect violations.

Often, after code is re-factored, it is possible that existing privilege-asserting or subject-executed code may become unnecessary; this occurs when existing calls to privilege-asserting code do not lead to authorization checks. From a performance perspective, this occurrence can be very expensive. From a security perspective, this occurrence can expose a system to security holes. When calls to privilege-asserting code are nested, only the call closer to the authorization check is necessary. The other calls are redundant and could lead to security holes and performance problems.

Typically, when calls to subject-executed code are nested, the most recently made call overwrites all the previous calls. The idea is that there can only be one subject associated with any thread of execution at any given time. In large and complex programs, it is often difficult, if not Impossible, to understand the interactions between nested calls to subject executed code unless an automated tool is available. Inappropriate usage of subject-executed code can lead to unintended results and security holes.

In some Implementations (such as Java™ 2), privilege-asserting code eliminates from a thread of execution any subject that had been previously associated with that thread. Many developers are not even aware of this behavior, which may lead to unintended consequences. A secure coding best practice suggests that privilege-asserting or subject executed code in a component should be placed as close as possible to the boundary between that component and other components. This helps in avoiding the execution of unintended privilege-asserting or subject executed code and assists in enforcing the principle that every call to privileged or subject-executed code should lead to only one security-sensitive resource at a time. However, many times, developers do not realize that the calls to privileged or subject-executed code that they make are not as close to the component's boundary as possible, especially because that boundary may still be unclear during development, or because code was subsequently re-factored.

No value generated in privilege-asserting code should flow to unauthorized code; a violation of this rule represents a confidentiality problem. Similarly, no value generated in unauthorized code should flow to privilege asserting code; a violation of this rule represents an integrity problem. The resolution of these problems by performing manual code inspection or testing is very difficult, time consuming and error prone. Therefore, there exists a need for an automatic technique for verifying that privileged and subject-executed code has been implemented as intended.

SUMMARY OF THE INVENTION

The shortcomings of the prior art are overcome and additional advantages are provided through the provision of a method for verifying privileged and subject-executed code within a program, the method further comprising the steps of constructing a static model of a program, wherein the static model comprises: an invocation graph, the invocation graph comprising a set of nodes and a set of edges, the invocation graph being configured to visually represent programming methods as nodes, and the calling context that is associated with a respective programming method, and a points-to graph, the points-to graph being configured to model the dependencies that exist between program objects, and identifying checkPermission nodes that are comprised within the invocation graph, wherein for each identified checkPermission node a permission set of the permission allocation sites that could flow to a Permission parameter of a method that is represented by the node with the context that is represented by the node is determined.

The method further comprises the steps of performing a fixed-point iteration, wherein each determined permission set is propagated backwards across the nodes of the static model until a privilege-asserting code node is reached, and associating each node of the invocation graph with a set of Permission allocation sites, the set of Permission allocation sites representing an over-approximation of all the Permissions that will be required at run time to execute the method represented by the node. Further comprised are the steps of analyzing each identified privilege-asserting code node and subject-executing code node to determine the Permission allocation site set that is associated with each privilege-asserting code node and subject-executing code node, and determining the cardinality of a Permission allocation-site set that is associated with each privilege-asserting code node and subject-executing code node; and analyzing the resultant Permission allocation cardinality data.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example representing the executions of two program threads within a Java™ 2 and CLR SBAC system.

FIG. 2 illustrates one example of privilege code in the Java™ 2 and CLR SBAC system.

FIG. 3 illustrates one example of library code for the propagation of authorization requirements to clients.

FIG. 4 illustrates one example of the propagation of unnecessary authorization requirements to client code.

FIG. 5 illustrates one example of library using privilege code.

Figure 6:
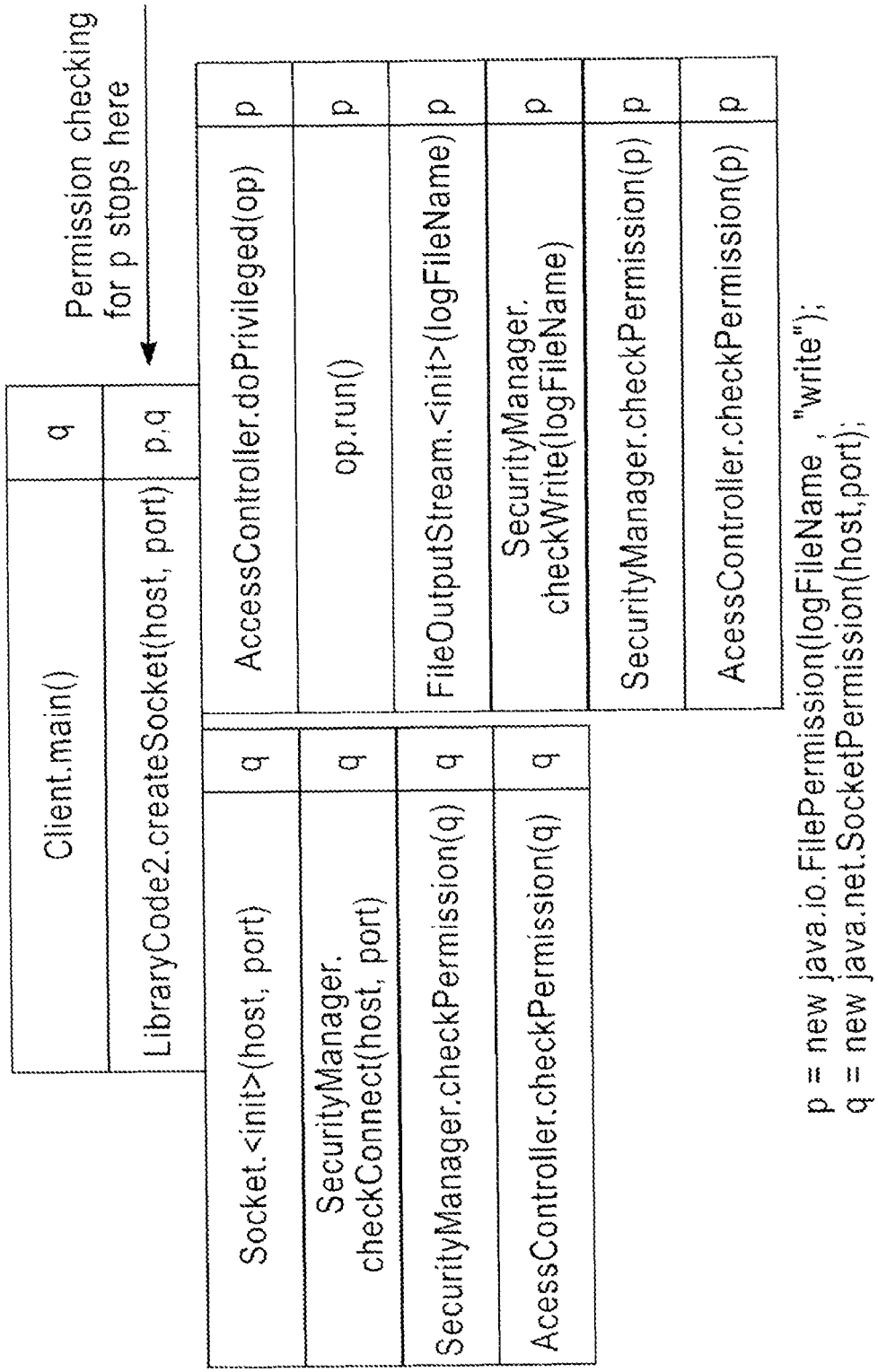
FIG. 6 illustrates one example of preventing the unnecessary authorization requirements for client code.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the present invention relate to the performance of static code analysis procedures, wherein the static code analysis is performed in accordance with formal analysis methodologies. Aspects of the present invention may be implemented within conventional computing systems, wherein the static analysis methodologies, as discussed herein, can be performed in accordance with conventional automated analysis tool methodologies.

The Java™ 2 and CLR programming models are extensively used in multiple types of Internet applications, especially applications relating to electronic commerce. Due to the distributed nature of such applications it is essential that when access to a restricted resource is attempted all code currently on a call stack is authorized to access the restricted resource. In Java™ 2, when access to a restricted resource is attempted the SecurityManager, if active, triggers access-control enforcement protocols by invoking an AccessController.checkPermission method command. This method utilizes a Permission object p as a parameter, and performs a stack walk to verify that each caller in a current thread of execution has been granted the access right that is represented by p.

In CLR, the stack walk is performed by the Demand method, which verifies that all the code currently on the stack has been granted the access right represented by a given IPermission object. FIG. 1 illustrates a comparison between the Java™ 2 100 and CLR 105 stack based access control (SBAC) systems. The two directed graphs in FIG. 1 represent the executions of two program threads (100, 105) on a Java™ 2 and CLR platform, respectively, where the vertices 110 in the graphs are representative of method invocations. If two vertices 110 are connected by an edge 115, that means that the method represented by the predecessor vertex 110 in tire edge 115 invokes the method represented by the successor vertex 110. In both platforms, when SBAC is enforced, a SecurityException is thrown if any one of the callers on the call stack does not have the appropriate access right.

Access Rights

Though programmatic security is possible, within both the Java™ 2 and CLR platforms access rights are preferably declarative granted. Within both platforms a system administrator grants access rights in a security policy database that is external to the application code; this aspect enhances code portability and reusability. Typically, in SBAC systems, access rights are by default denied to all code and subjects. Untrustworthy code and subjects will only be allowed to perform basic operations that cannot harm the system. For a restricted operation to succeed, all the code on the thread's stack must be explicitly granted the right, to execute that operation.

Within Java™ 2, access rights are represented as objects of type Permission. Each Permission type must be a subclass of the Permission abstract class. When a Permission object is constructed, it can take zero (0), one (1), or two (2) string objects as parameters. If present, a first parameter is called the target of the Permission object and represents the resource that is being protected, whereas the second parameter is called the action of the Permission object and represents the mode of access. The target and action are used to qualify the resource being protected by the Permission object. For example, the following line of code can be used to construct a Permission object representing the right to access the log.txt file in read and write mode:

Permission p=new FilePermission("log.txt","read, write");

Given a Permission object p, p's fully qualified Permission class name along with p's target and action, if any, uniquely identify the authorization requirement represented by p. Therefore, for authorization purposes, a Permission object p can be characterized solely based on p's permission ID, which consists of p's fully qualified class name and the values of the String instances used to instantiate p. Moreover, in the Java™ 2 Runtime Environment (J2RE) reference implementation, authorizations are granted to programs and principals by just listing the corresponding permission IDS in a flat-file policy database, called the policy file.

The Permission class contains the abstract method named implies, which itself takes a Permission object as a parameter and returns a Boolean value that every non-abstract Permission subclass must implement. If p and q are two Permission objects and p.implies (q) returns true, then this means that, granting p is implicitly equivalent to having granted q as well. For example, p could be the Permission object constructed above and q could be the Permission object constructed with the following line of code:

Permission q=new FilePermission("log.txt","writes");

If p is an instance of the AllPermission class, then p.implies(q) returns true for any Permission object q.

Access rights may be granted to code based on the code source, which is a combination of the code base (i.e., the network location from which the code is coming) and the digital certificates of the entities that digitally signed the code. In Java™ 2, access rights are granted to classes, wherein each class is loaded at run time by a class loader. Class loaders are organized as a tree, the tree being referred to as the classloading delegation tree. A class loader, when it loads a class, constructs a protection domain characterizing the origin of the class being loaded, and associates It with the class itself. A protection domain, which is represented as an object of type ProtectionDomain, encapsulates the class code source (which is represented as a Codesource object) and a PermissionCollection object that contains all of the Permissions corresponding to the access rights that have been granted to the code source. When invoked with a Permission p as a parameter, checkPermission performs a stack walk and verifies that each of the ProtectionDomains in the current thread of execution contains at least one Permission that implies p. The set of Permissions effectively granted to a thread of execution is the intersection of the sets of Permissions implied by all of the ProtectionDomains associated with the stack. Access-control enforcement employed on a CLR platform is implemented in a similar manner.

From a security point-of-view, it should be noted that violations of the Principle of Least Privilege could arise in the instance that unnecessary rights are granted to code. Conversely, if the rights granted to code are insufficient to meet the code's security requirements, run-time authorization failures may then occur; such an occurrence can cause an application to crash.

Privilege-Asserting Code

Often, trusted library code is programmed to perform access-restricted operation—such operations as writing to a log file or reading from a configuration file that an untrustworthy client did not explicitly request. Since the untrustworthy client will be on the call stack when access control is enforced, the operation will not succeed unless the client code is authorized as well. To avoid authorizing the client (this action constituting a violation of the Principle of Least Privilege) the portion of library code performing the restricted operation can be made privileged.

in Java™ 2, a block of library code is made privilege-asserting by wrapping the code within a call to AccessController.doPrivileged. This method takes either a PrivilegedAction or a PrivilegedExceptionAction parameter, whose run method contains the portion of code that needs to be made privileged. When access control is enforced, the presence of privilege-asserting code on the call stack causes the stack walk to stop at the stack frame corresponding to the library method calling doPrivileged. As a result, the library code calling do Privileged must have been granted the right to perform the restricted operation, but the client code is implicitly granted that right while the current thread is executing. A potential problem generated by doPrivileged is that if a call to doPrivileged leads to multiple checkPermission calls with different, Permissions being checked, all those Permissions will be implicitly indiscriminately granted to client code.

In CLR, the mechanism for privilege-asserting code is more granular. To make code privileged, a trusted library code must call the Assert method with an IPermission object p as a parameter. The difference from Java'™ doPrivileged is that Assert, does not cause the stack walk to stop, but instead adds p to the stack frames above the library method that makes the call to Assert. Therefore, unlike doPrivileged, Assert allows specifying exactly which access right should be implicitly granted to client code, regardless of the IPermission being checked by the Demand method currently on the stack. FIG. 2 shows and compares how privilege-asserting code works in the Java™ 2 and CLR platforms, respectively.

The Java™ 2 platform offers another form of doPrivileged that takes an additional AccessControlContext instance as an argument. This instance encapsulates an array of ProtectionDomain objects that are typically associated with the thread stack at the moment in which the AccessControlContext was instantiated. When it encounters a call from this form of doPrivileged, checkPermission stops its stack walk at the stack frame corresponding to the method that made that doPrivileged call. In addition, check-Permission performs an authorization test on each of the ProtectionDomains encapsulated in the AccessControlContext.

Library Code Access Control

When a client application makes a call to a trusted library, the library often accesses restricted resources that the client never intended to, or does not need to directly access. For instance, assume that a Java™ program is authorized to open a network socket. To do so, it invokes createsocket on the LibraryCode library class as illustrated in FIG. 3. On opening a socket on behalf of a client program, the library is programmed to log the socket operation to a file for auditing purposes. As shown in FIG. 4, according to the Java™ 2 SDAC model, both the library 410 and its client 415 will need to be granted the File Permission to modify the log file and the SocketPermission to create the socket connection (as dictated by the preceding methods 405), even though the client did not explicitly request, to write to the log file. Granting that FilePermission to the client code would violate the Principle of Least Privilege.

One way to circumvent this particular problem is to mark the portion of the library code responsible for logging as privileged. On a Java™ 2 platform, this prevents the stack inspection for the log operation from going beyond the createsocket method, and temporarily exempts the client from the FilePermission requirement during the execution of createsocket. From a practical point of view, a Java™ developer must implement either the PrivilegedExceptionAction or PrivilegedAction interface depending on whether the privilege-asserting code could throw a checked Exception or not, respectively. Both of these interfaces have a run method that upon implementation must contain the portion of library code performing the restricted operation not directly requested by the client. Next, the PrivilegedExceptionAction or PrivilegedAction instance is passed as a parameter to the doPrivileged method, which will invoke the instance's run method.

Class LibraryCode2 (illustrated in FIG. 5) is obtained by modifying class LibraryCode in FIG. 3 after wrapping the call to the FileOutputStream constructor in a privileged block to prevent client, code from requiring a FilePermission. As shown in FIG. 6, when the checkPermission method performs a stack walk to verify that all the code in the active calling sequence (605, 610, 615) has been granted the right to write to the log file, the LibraryCode2 610 class will be required to have the necessary FilePermission, but the client code 615 running on top of the LibraryCode2 610 will not be required to have the necessary FilePermission. However, the client code 615 will still be required to have the SocketPermission necessary to open the socket since the call to the Socket constructor in LibraryCode is not privileged.

Taking preexisting library code and understanding which portions of it should be made privileged by performing manual code inspection is a difficult task, a task that is even more challenging when the library is large or complex. Besides identifying the blocks of library code that require authorizations, developers must understand which authorizations are implicitly granted to possibly unknown client code when the library code is made privileged. Frequently, libraries are not written with security as a concern, or they are written to run on a version of the Java™ Runtime Environment (JRE) prior to 1.2. When a Java™ 2 SecurityManager is finally turned on for a particular application, SecurityExceptions are thrown due to access control violations. It may be very difficult to understand which portions of library code should be made privileged in order to prevent client code from requiring unnecessary authorizations that are only needed by the library code.

In practice, this problem is solved empirically. A developer tests the library code with sample client code that makes calls into the library. Typically, the client code is granted only a limited number of authorizations, while the library is granted sufficient authorizations, such as AllPermission. Next, it is necessary to take note of all the SecurityExceptions generated when running the test cases, and to distinguish between two categories of SecurityExceptions, the categories defined as follows:

Category 1. The SecurityExceptions due to the client code's attempting to access some restricted resources through the library without the adequate authorizations.

Category 2. The SecurityExceptions due to the library's attempting to access some restricted sources on its own without using privilege-asserting code.

Eliminating a SecurityException of Category 2 requires inspecting the library source code, identifying which portion of it is responsible for accessing the protected resource, and making that portion of code privileged. Granting the client code the necessary access rights can eliminate a SecurityException of Category 1. This operation must be performed cautiously; granting authorizations to the client could hide the SecurityException of Category 2. Manually performing this task can be a difficult, tedious, and error prone procedure. After modifying the library code, or the client security policy, a developer must rerun the test cases. This means that the process must be repeated, possibly many times, until there are no more authorization failures. However, do Privileged requirements in the library code may remain undiscovered during testing due to an insufficient number of test cases, which makes the production code potentially unstable. Aspects of the present invention assume that privilegeasserting code has already been placed, and teaches how to use static analysis to verify that the code was placed correctly and without violating important security guidelines.

It is also important to avoid introducing "unnecessary" and "redundant" privileged blocks code. Privileged code is unnecessary if there is no path from it to any security check, and it is redundant if all the security checks it leads to are covered by other privilege-asserting code. Unnecessary or redundant privilege-asserting code may lead to violations of the Principle of Least Privilege, especially during subsequent code maintenance. Additionally, from a performance point of view, it can be expensive. Therefore, such code should be made unprivileged.

In the Java™ 2 SBAC system, when access to a restricted resource is attempted from within a child thread, it is not just the code on the stack of the child thread that must be granted the right to perform the access-restricted operation, but all the code in the child thread and in all its ancestor threads. This is done to prevent a program from performing security-sensitive operations by simply spawning a new thread, which would have fewer classes associated with the runtime stack, and therefore be potentially more trusted than its ancestor threads.

Subject-Based Authorization

Both Java™ and CLR allow basing authorization decisions on the user or service (called the Subject) that is executing the code. Java™ Authentication and Authorization Service (JAAS) extends the Java™ 2 code-based access control framework to support subject-based authentication and authorization. In Java™, a subject is represented as an object of type Subject. When a subject is authenticated, the corresponding Subject instance is populated with associated identities called principals, represented as objects of type Principal. A subject may have multiple associated principals. For example, if the subject is a person, two of the subject's associated principals could be the person's name and social security number.

In Java™ 2, access rights are granted to code and principals, but not directly to subjects. The set of access rights granted to a subject is obtained as the union of the sets of access rights granted to the subject's authenticated principals. The JAAS framework offers the static methods Subject.doAs and Subject.doAsPrivileged to perform a restricted operation with the access rights granted to a subject.

The doAs method takes two parameters: the first is a Subject object, and the second is either a PrivilegedExceptionAction or PrivilegedAction object. The code in the run method of the PrivilegedExceptionAction or PrivilegedAction instance is executed with the intersection of the sets of Permissions granted to the code on the call stack. However, doAs adds the Permissions granted to the subject's principals to the stack frames subsequent to the call to doAs.

The doAsPrivileged method is similar to doAs, but it takes a third parameter, an AccessControlContext object, which encapsulates an array of ProtectionDomains. Similar to doAs, the doAsPrivileged method also adds the Permissions granted to the subject's principals to the subsequent stack frames. However, unlike in the doAs case, when checkPermission is called with a Permission parameter p after a call to doAsPrivileged, the doAsPrivileged predecessors are not required to have been granted a Permission that implies p. Rather, doAsPrivileged interrogates the ProtectionDomains in the AccessControlContext passed to it as a parameter.

Violations of the Principle of Least Privilege may arise if any of the access rights granted to a subject's principals are unnecessary. Conversely, if the rights granted are insufficient to meet the security requirements of an application, run-time authorization failures may occur, which could cause the application to crash.

Similar to privilege-asserting code, code executed under the authority of a subject can be "unnecessary" or "redundant." Specifically, a call to doAs or doAsPrivileged is unnecessary if it does not lead to any checkPermission call, and it is redundant if all the checkPermission calls it leads to are covered by calls to doPrivileged, Code unnecessarily or redundantly executed under the authority of a subject may lead to violations of the Principle of Least Privilege, especially during subsequent code maintenance. Additionally, from a performance point of view, the execution of this unnecessary or redundant code can be expensive.

Static Representation of a Program's Execution

Within aspects of the present inventions embodiments of the present invention comprise the modeling of the execution of a program by the use of static analysis techniques. The static analysis of code is more effective than other approaches, such as manual code inspection and testing. Manual code inspection is tedious, time consuming and error prone, and may become impossible if the source code of the program being analyzed is not completely available. Dynamic analysis or testing is also problematic since it requires having a complete suite of test cases. In absence of such a suite, the analysis may not detect problems or requirements until the program is deployed in the enterprise. Additionally, dynamic analysis requires executing code, which means that potentially unsafe code could harm the underlying platform on which testing is performed. Conversely, a static analysis model represents the execution of a program, without actually requiring the program to be executed. For the purposes of this invention, a program will be modeled with its invocation graph and its points-to graph.

The first step in the static analysis is to construct an augmented, domain-specific invocation graph. The invocation graph is a directed multi-graph G=(N, E), where N is a set of nodes and E is a set of edges. Each node in the graph represents a context-sensitive method invocation and is uniquely identified by its calling context, the calling context comprising the target method and the receiver method and parameter values. Each node also contains state information pertaining to the target, de-virtualized method, for instance methods (i.e., a set of possible allocation sites for the method's receiver) and all parameters to the method; the parameters being represented as a vector of sets of possible allocation sites. The state information also comprises a set of possible return value allocation sites from the method. Each node is further associated with a static representation of a class loader corresponding to the name of the class loader that would load the method's declaring class at run time based upon configuration information provided as input to the invocation-graph construction engine.

Within each node in the graph each labeled edge e=(m,n)∈ E points from a call site in the method represented by node m to the target method represented by node n. Further, the invocation graph allows for bidirectional traversal.

The invocation graph has a unique node, $\bar{n} \in N$, called the root, representing a client program invoking the entry points of the program under analysis. Therefore, if $s_1, s_2, \ldots s_k \in N$ are the nodes representing the program entry points, there exist k edges $e_1(\bar{n}, s_1), e_2=(\bar{n}, s_2), \ldots, e_k=(\bar{n}, s_k)$ connecting $\bar{n}$ with $s_1, s_2, \ldots s_k$, respectively. The presence of $e_1, e_2, \ldots e_k$, and the fact that, a node $\bar{n} \in N$ is constructed if and only if it has been statically established that the method represented by n, can be invoked during the execution of the program under analysis, guarantee that all the nodes in the invocation graph are reachable from $\bar{n}$. This implies also that the invocation graph is a connected multi-graph.

The invocation graph can be constructed on top of a static-analysis framework, preferably one that analyzes compiled code (byte code in Java™) rather than source code; this is preferable because source code is not always available. A good choice for an invocation-graph construction algorithm is one that adopts a Control-Flow Analysis (CFA) disambiguating between heap objects according to their allocation sites. To be precise and scalable at the same time, the invocation graph construction algorithm should be:

Path insensitive: it does not evaluate conditional statements and conservatively assumes that each conditional branch out of a conditional statement will be executed.

Intra-procedurally flow sensitive: it considers the order of execution of the instructions within each basic block, accounting for local-variable kills and casting of object references.

Inter-procedurally flow insensitive: it uses the conservative assumption that all instance and static fields are subject to modification at any time due to multithreading.

Context sensitive: its inter-procedural analysis uniquely distinguishes each node by its calling context, with a context-sensitivity policy similar to Agesen's Cartesian Product Algorithm Field sensitive: an object's fields are represented distinctly in the solution.

From a security perspective, context sensitivity is certainly very important since an authorization analysis for Java™ needs to distinguish different calls to checkPermission based on the Permission parameter passed to it. If this were not the case, all the checkPermission calls in the program would be represented as one node, and any authorization analysis based on that invocation graph would conservatively join together all the Permission requirements identified in the program.

Contextually with the intra-procedural and inter-procedural analyses that lead to the creation of the invocation graph, the static analyzer performs a pointer analysis and constructs a points-to graph $\bar{G}=(\bar{N}, \bar{E})$ which models the various dependencies between objects. After the static model (invocation graph and points-to graph) of the program under analysis is constructed the checkPermission nodes in the invocation graph are identified, and for each of those nodes n the set P(n) of the permission allocation sites that could flow to the Permission parameter of the method represented by n with the context represented by n are identified. Next, a fixed-point iteration is performed in which all the Permission sets are propagated backwards across the nodes in the invocation graph, until a doPrivileged node is reached. According to the model, a doPrivileged node allows propagating Permission objects only to their immediate predecessors.

When this process terminates, each node in the invocation graph is associated with a set of Permission allocation sites. That set approximates the access rights necessary to invoke the method represented by n at run time. Each doPrivileged node can then be inspected to see what is the Permission allocation-site set associated with it. If the cardinality of that set is more than one (1), then this is an indication that the guideline of using doPrivileged to shield client code from only one access right is potentially violated. The same can be done for every doAs and doAsPrivileged node to ensure that subject-executed code only enables one access right at a time. On the other hand, if the cardinality of the Permission allocation-site set associated with a doPrivileged, doAs, or doAsPrivileged node is zero (0), this is a clear indication that the privilegeasserting or subject-executed code is unnecessary or redundant, and should be made non-privilege-asserting or non-subject-executed, respectively.

Within further aspects of the present invention, the invocation graph can be inspected also to detect nested calls to doAs, doAsPrivileged, and doPrivileged and report them to the developer to flag cases in which a subject overrides the identity of another subject on the stack, as explained above. Additionally, the invocation graph reveals if calls to doAs, doAsPrivileged, and doPrivileged in a component are as close as possible to the boundary between that component and another component. Ideally, such calls should be the last calls inside a component, before accessing another component. An invocation-graph inspection can be performed to detect if that is not the case. Violations of this guideline can be reported and the security exposures caused by those violations can be eliminated.

Within yet further aspects of the present invention a data and control-flow analysis in the static model can be used to detect confidentiality problems that may occur due to values generated inside a privilege-asserting code flowing to unauthorized components, and integrity problems due to values generated inside unauthorized components flowing to privilege asserting code.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as apart of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for verifying privileged and subject-executed code within a program, the method further comprising the steps of:
   constructing a static model of a program, wherein the static model comprises:
      an invocation graph, the invocation graph comprising a set of nodes and a set of edges, the invocation graph being configured to visually represent programming methods as nodes, and the calling context that is associated with a respective programming method; and
      a points-to graph, the points-to graph being configured to model the dependencies that exist between program objects;
   identifying checkPermission nodes that are comprised within the invocation graph, wherein for each identified checkPermission node a permission set of the permission allocation sites that could flow to a Permission parameter of a method that is represented by the node with the context that is represented by the node is determined;
   performing a fixed-point iteration, wherein each determined permission set is propagated backwards across the nodes of the static model until a privilege-asserting code node is reached;
   associating each node of the invocation graph with a set of Permission allocation sites, the set of Permission allocation sites representing an over-approximation of all the Permissions that will be required at run time to execute the method represented by the node;
   analyzing each identified privilege-asserting code node and subject-executing code node to determine the Permission allocation site set that is associated with each privilege-asserting code node and subject-executing code node;
   determining the cardinality of a Permission allocation-site set that is associated with each privilege-asserting code node and subject-executing code node; and
   analyzing the resultant Permission allocation cardinality data.

2. The method of claim 1, wherein a Permission allocation-site set approximates the access rights that are necessitated to invoke a method that is represented by a node at the time of the execution of a program.

3. The method of claim 2, wherein if the cardinality of a Permission allocation-site set is greater than one, then this serves as an indication of a potential violation of access rights protocols.

4. The method of claim 3, wherein if the cardinality of a Permission allocation-site set is equal to zero, then this serves as an indication that a respective privilege-asserting or subject-executing code node is unnecessary or redundant.

5. The method of claim 4, wherein the static model is analyzed to detect the presence of nested calls to privilege-asserting code and subject-executing code.

6. The method of claim 4, wherein the static model is analyzed to ascertain the position of the privilege-asserting code and the subject-executing code in relation to a boundary of a component.

7. The method of claim 4, further comprising the step of performing a data and a control flow analysis of the static model to detect program confidentiality issues that are a result of values that have been generated by privilege-asserting code, wherein the values subsequently flow to unauthorized components.

8. The method of claim 4, further comprising the step of performing a data and a control flow analysis of the static model to detect program integrity issues that are a result of values that have been generated by unauthorized components, wherein the values subsequently flow to privilege-asserting code.

9. The method of claim 4, wherein the privilege-asserting code node comprises a doPrivileged specified node.

10. The method of claim 4, wherein the subject-executing code node comprises a doAs or doAsPrivileged specified node.

11. A computer program product, that includes a computer readable medium useable by a processor, the medium having stored thereon a sequence of instructions which, when executed by the processor, causes the processor to verify privileged and subject-executed code within a program, wherein the computer program product executes the steps of:
   constructing a static model of a program, wherein the static model comprises:
      an invocation graph, the invocation graph comprising a set of nodes and a set of edges, the invocation graph being configured to visually represent programming methods as nodes, and the calling context that is associated with a respective programming method; and
      a points-to graph, the points-to graph being configured to model the dependencies that exist between program objects;
   identifying checkPermission nodes that are comprised within the invocation graph, wherein for each identified checkPermission node a permission set of the permission allocation sites that could flow to a Permission parameter of a method that is represented by the node with the context that is represented by the node is determined;
   performing a fixed-point iteration, wherein each determined permission set is propagated backwards across the nodes of the static model until a privilege-asserting code node is reached;
   associating each node of the invocation graph with a set of Permission allocation-sites, the set of Permission allocation sites representing an over-approximation of all the Permissions that will be required at run time to execute the method represented by the node;

analyzing each identified privilege-asserting code node and subject-executing code node to determine the Permission allocation site set that is associated with each privilege-asserting code node and subject-executing code node; and determining the cardinality of a Permission allocation-site set that is associated with each privilege-asserting code node and subject-executing code node.

12. The computer program product, of claim 11, wherein a Permission allocation-site set approximates the access rights that are necessitated to invoke a method that is represented by a node at the time of the execution of a program.

13. The computer program product of claim 12, wherein if the cardinality of a Permission allocation-site set is greater than one, then this serves as an indication of a potential violation of access rights protocols.

14. The computer program product of claim 3, wherein if the cardinality of a Permission allocation-site set is equal to zero, then this serves as an indication that a respective privilege-asserting or subject-executing code node is unnecessary or redundant.

15. The computer program product of claim 14, wherein the static model is analyzed to detect the presence of nested calls to privilege-asserting code and subject-executing code.

16. The computer program product of claim 14, wherein the static model is analyzed to ascertain the position of the privilege-asserting code and the subject-executing code in relation to a boundary of a component.

17. The computer program product of claim 14, further comprising the step of performing a data and a control flow analysis of the static model to detect program confidentiality issues that are a result of values that have been generated by privilege-asserting code, wherein the values subsequently flow to unauthorized components.

18. The computer program product of claim 14, further comprising the step of performing a data and a control flow analysis of the static model to detect program integrity issues that are a result of values that have been generated by unauthorized components, wherein the values subsequently flow to privilege-asserting code.

19. The computer program product of claim 14, wherein the privilege-asserting code node comprises a doPrivileged specified node.

20. The computer program product of claim 4, wherein the subject-executing code node comprises a doAs or doAsPrivileged specified node.

21. An article of manufacture verifying privileged and subject-executed code within a program, the article of manufacture storing machine readable instructions, which when executed cause the machine to perform the steps of:

constructing a static model of a program, wherein the static model comprises:
   an invocation graph, the Invocation graph comprising a set of nodes and a set of edges, the invocation graph being configured to visually represent programming methods as nodes, and the calling context that is associated with a respective programming method; and
   a points-to graph, the points-to graph being configured to model the dependencies that exist between the node and edge valises:

identifying checkPermission nodes that are comprised within the invocation graph, wherein for each identified checkPermission node a permission set of the permission allocation sites that could flow to a Permission parameter of a method that is represented by the node with the context that is represented by the node is determined;

performing a fixed-point iteration, wherein each determined permission set is propagated backwards across the nodes of the static model until a privilege-asserting code node is reached;

associating each node of the invocation graph with a set of Permission allocation-sites, the set of Permission allocation sites representing an over-approximation of all the Permissions that will be required at run time to execute the method represented by the node;

analyzing each identified privilege-asserting code node and subject-executing code node to determine the Permission allocation site set that is associated with each privilege-asserting code node and subject-executing code node; and determining the cardinality of a Permission allocation-site set that is associated with each privilege-asserting code node and subject-executing code node.

* * * * *